(12) United States Patent
Grunnet et al.

(10) Patent No.: US 11,187,210 B2
(45) Date of Patent: Nov. 30, 2021

(54) DETECTING WATER ON A WIND TURBINE USING A TEMPERATURE-CONTROLLED SENSOR

(71) Applicant: VESTAS WIND SYSTEMS A/S, Aarhus N (DK)

(72) Inventors: Jacob Deleuran Grunnet, Tranbjerg J (DK); Johnny Nielsen, Svenstrup J (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 16/627,414

(22) PCT Filed: Jun. 21, 2018

(86) PCT No.: PCT/DK2018/050158
§ 371 (c)(1),
(2) Date: Dec. 30, 2019

(87) PCT Pub. No.: WO2019/001667
PCT Pub. Date: Jan. 3, 2019

(65) Prior Publication Data
US 2020/0124032 A1  Apr. 23, 2020

(30) Foreign Application Priority Data
Jun. 29, 2017  (DK) .............. PA201770518

(51) Int. Cl.
*F03D 80/40* (2016.01)
*F03D 17/00* (2016.01)

(52) U.S. Cl.
CPC ............. *F03D 80/40* (2016.05); *F03D 17/00* (2016.05); *F05B 2260/80* (2013.01);
(Continued)

(58) Field of Classification Search
CPC ...... F03D 80/40; F03D 17/00; F05B 2260/80; F05B 2270/303; F05B 2270/802; F05B 2270/803
See application file for complete search history.

(56) References Cited

U.S. PATENT DOCUMENTS

2007/0018834 A1    1/2007  Rasmussen et al.
2014/0072429 A1*   3/2014  Krainer .................. F03D 80/40
                                                         416/1
(Continued)

FOREIGN PATENT DOCUMENTS

CN    102407942 A    4/2012
CN    102438903 A    5/2012
(Continued)

OTHER PUBLICATIONS

Danish Patent and Trademark Office Search Report for Application No. PA 2017 70518 dated Dec. 21, 2017.
(Continued)

*Primary Examiner* — Sean Gugger
(74) *Attorney, Agent, or Firm* — Patterson + Sheridan, LLP

(57) ABSTRACT

Embodiments herein describe a system used to estimate the presence of water on a sensor. A parameter maintains a wind sensor temperature. The parameter can be tracked and evaluated to indicate a likelihood of water on the sensor. Alternatively, or in combination with the above, the sensor is adjusted intentionally or deactivated and reactivated to track a parameter response which is then used to indicate a likelihood of water on the sensor.

8 Claims, 11 Drawing Sheets

(52) U.S. Cl.
CPC ... *F05B 2270/303* (2013.01); *F05B 2270/802* (2013.01); *F05B 2270/803* (2013.01)

(56) References Cited

U.S. PATENT DOCUMENTS

| | | | | |
|---|---|---|---|---|
| 2015/0023792 | A1* | 1/2015 | Spitzner | F03D 80/40 416/1 |
| 2016/0053747 | A1* | 2/2016 | Olesen | F03D 17/00 219/553 |

FOREIGN PATENT DOCUMENTS

| | | |
|---|---|---|
| CN | 203161453 U | 8/2013 |
| CN | 103687101 A | 3/2014 |
| CN | 105121845 A | 12/2015 |
| CN | 205067511 U | 3/2016 |
| EP | 2202408 A2 | 6/2010 |
| WO | 2007138450 A1 | 12/2007 |
| WO | 2012083962 A1 | 6/2012 |
| WO | 2013107457 A1 | 7/2013 |
| WO | 2019001667 A1 | 1/2019 |

OTHER PUBLICATIONS

Danish Patent and Trademark Office 1st Technical Examination for Application PA 2017 70518 dated Dec. 21, 2017.

PCT Written Opinion of the International Searching Authority for Application No. PCT/DK2018/050158.

PCT International Search Report for Application PCT/DK2018/050158 dated Sep. 10, 2018.

Chinese Office Action for Application No. 201880041921.9 dated Aug. 26, 2020.

\* cited by examiner

DETECTING WATER ON A WIND TURBINE USING A TEMPERATURE-CONTROLLED SENSOR

BACKGROUND

Field of the Invention

Embodiments presented in this disclosure generally relate to determining icing conditions on wind turbines, and more specifically, to using a temperature-controlled sensor to detect the presence of water on a wind turbine.

Description of the Related Art

Wind turbines are often placed in colder regions because cold air has a higher density and other energy producing systems are often impractical in these regions. However, in cold regions, ice formation on the turbines is more likely. Ice formation on the turbines lowers efficiency and removing the ice can require stopping the turbine, further reducing efficiency. Currently, turbines with anti-icing or de-icing systems use a significant reduction of the power curve to detect ice on the blades. However, this detection technique does not detect icing conditions before a substantial amount of ice has accumulated on the blades and the de-icing system might be unable to remove the ice if the icing conditions are ongoing or ice will build up again soon after the de-icing is finished. Other ice detection methods based on adding accelerometers on the inside of the turbine blades or dedicated ice detection instruments on the nacelle are expensive.

SUMMARY

One embodiment of the present disclosure is a controller for a wind turbine that includes a processor and a memory having an application that, when executed by the processor, performs an operation that includes monitoring an adjustable parameter used to control a heating element in a sensor, wherein the heating element sets a temperature of the sensor. The operation also includes determining a likelihood that water is disposed on the sensor based on monitoring the adjustable parameter over a period of time and then activating at least one of an anti-icing system and a de-icing system based on the likelihood.

Another embodiment described herein is a method for detecting ice that includes monitoring an adjustable parameter used to control a heating element in a sensor, where the heating element sets a temperature of the sensor. The method also includes determining a likelihood that water is disposed on the sensor based on monitoring the adjustable parameter over a period of time and then activating at least one of an anti-icing system and a deicing system based on the likelihood.

Another embodiment described herein is an ice detecting system for a wind turbine that includes a wind sensor having a heating element configured to set a temperature of the sensor based on an adjustable parameter. The embodiment also incudes a controller that is configured to monitor the adjustable parameter over a period of time, determine a likelihood that water is disposed on the sensor based on monitoring the adjustable parameter over the period of time, and then activates at least one of an anti-icing system and a deicing system based on the likelihood.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

A wind turbine uses a rotor consisting of multiple blades to convert kinetic energy of the wind into electrical energy. Specifically, the velocity of the wind causes the blades to rotate which in turn powers an electric generator. When ice is detected on wind turbine blades, different techniques can remove the ice either during power production when the blades are rotating or when the turbine is at a standstill. Ice on the blades lowers turbine efficiency and may cause improper balance, which can damage the turbine. Detecting icing conditions by measuring meteorological conditions and estimating the likelihood of ice formation on the blades has the benefit of proactively preventing ice buildup before a loss of efficiency or without stopping the rotor from spinning.

In one embodiment, a turbine is equipped with a temperature-controlled wind sensor. In one embodiment, the wind sensor has a built in heating element which ensures that the temperature of the sensor is maintained at a specific setpoint. In one embodiment, the sensor draws electrical power to maintain the temperature setpoint. A wind turbine controller can monitor an adjustable parameter used to control the heating element in the sensor to detect the presence of liquid on the wind turbine. In one example, the adjustable parameter is the electrical power drawn by the wind sensor to keep the wind sensor at a constant temperature which is strongly dependent on ambient temperature, wind speed, and the presence of liquid water or ice on the sensor. The power required to maintain or restore the temperature setpoint increases when ice or water is present on the sensor.

In one embodiment, the likelihood that water (e.g., either liquid water or ice) is present on the sensor can be determined by comparing ambient temperature and wind speed to the adjustable parameter. In one embodiment, empirical data is used to determine the likelihood of water on the wind sensor by comparing the data to current weather conditions and tracking the adjustable parameter. Therefore, in at least one embodiment, the response of the adjustable parameters of the wind sensor to various weather conditions is already known, making the relationship of the power and water precise enough to predict the presence of water on the sensor and therefore the likelihood of ice formation on the wind turbine generator.

Example Embodiments

Figure 1:
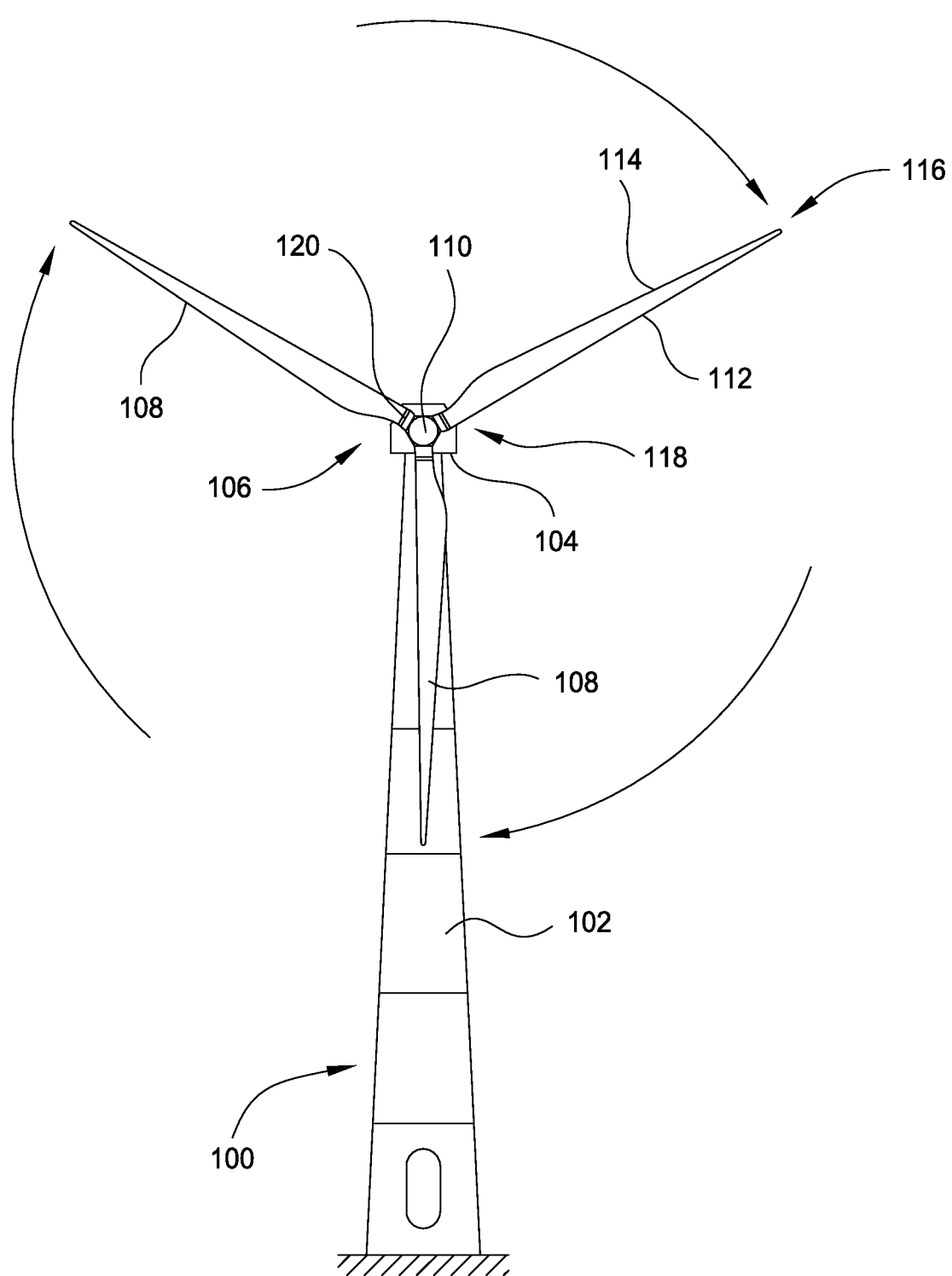
FIG. 1 illustrates a diagrammatic view of a wind turbine, according to an embodiment described in this present disclosure.

FIG. 1 illustrates a diagrammatic view of a horizontal-axis wind turbine generator 100. The wind turbine generator 100 typically comprises a tower 102 and a wind turbine nacelle 104 located at the top of the tower 102. A wind turbine rotor 106 may be connected with the nacelle 104 through a low speed shaft extending out of the nacelle 104. The wind turbine rotor 106 comprises three rotor blades 108 mounted on a common hub 110 which rotate in a rotor plane, but may comprise any suitable number of blades, such as one, two, four, five, or more blades. The blades 108 (or airfoil) typically each have an aerodynamic shape with a leading edge 112 for facing into the wind, a trailing edge 114 at the opposite end of a chord for the blades 108, a tip 116, and a root 118 for attaching to the hub 110 in any suitable manner.

For some embodiments, the blades 108 may be connected to the hub 110 using pitch bearings 120 such that each blade 108 may be rotated around its longitudinal axis to adjust the blade's pitch. The pitch angle of a blade 108 relative to the rotor plane may be controlled by linear actuators, hydraulic actuators, or stepper motors, for example, connected between the hub 110 and the blades 108.

Figure 2:
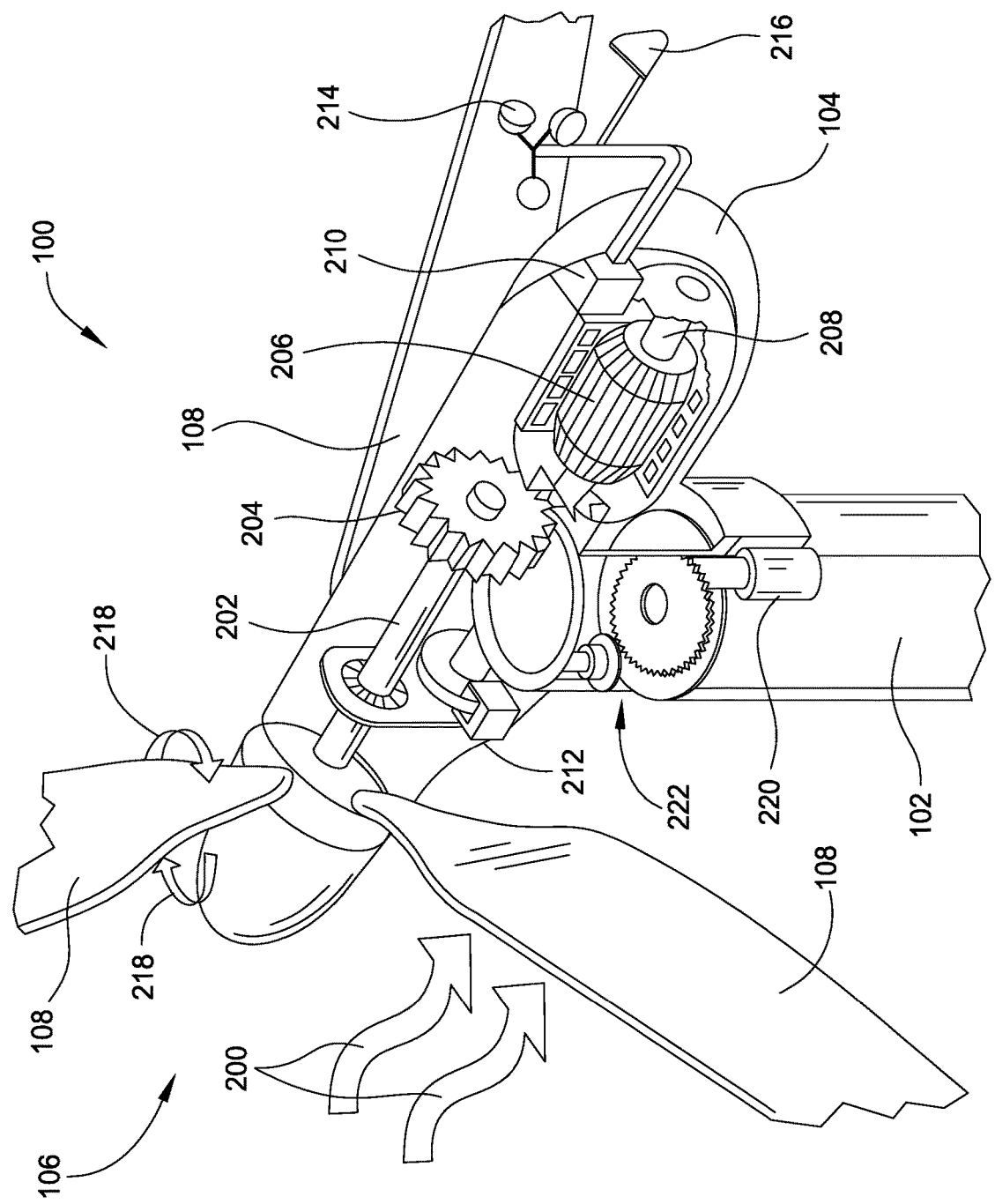
FIG. 2 illustrates a diagrammatic view of the components internal to the nacelle and tower of a wind turbine, according to an embodiment described in this present disclosure.

FIG. 2 illustrates a diagrammatic view of typical components internal to the nacelle 104 and tower 102 of a wind turbine generator 100. When the wind 200 pushes on the blades 108, the rotor 106 spins and rotates a low-speed shaft 202. Gears in a gearbox 204 mechanically convert the low rotational speed of the low-speed shaft 202 into a relatively high rotational speed of a high-speed shaft 208 suitable for generating electricity using a generator 206.

A controller 210 may sense the rotational speed of one or both of the shafts 202, 208. If the controller decides that the shaft(s) are rotating too fast, the controller may pitch the blades out of the wind or by increasing the torque form the generator 206 which slows the rotation of the rotor 106—i.e., reduces the revolutions per minute (RPM). A braking system 212 may prevent damage to the components of the wind turbine generator 100 by keeping the hub 110 from rotating when the hub is already at, or very close, to standstill. The controller 210 may also receive inputs from an anemometer 214 (providing wind speed) and/or a wind vane 216 (providing wind direction). Based on information received, the controller 210 may send a control signal to one or more of the blades 108 in an effort to adjust the pitch 218 of the blades. By adjusting the pitch 218 of the blades, the rotational speed of the rotor (and therefore, the shafts 202, 208) may be increased or decreased. Based on the wind direction, for example, the controller 210 may send a control signal to an assembly comprising a yaw motor 220 and a yaw drive 222 to rotate the nacelle 104 with respect to the tower 102, such that the rotor 106 may be positioned to face more (or, in certain circumstances, less) upwind.

Figure 3:
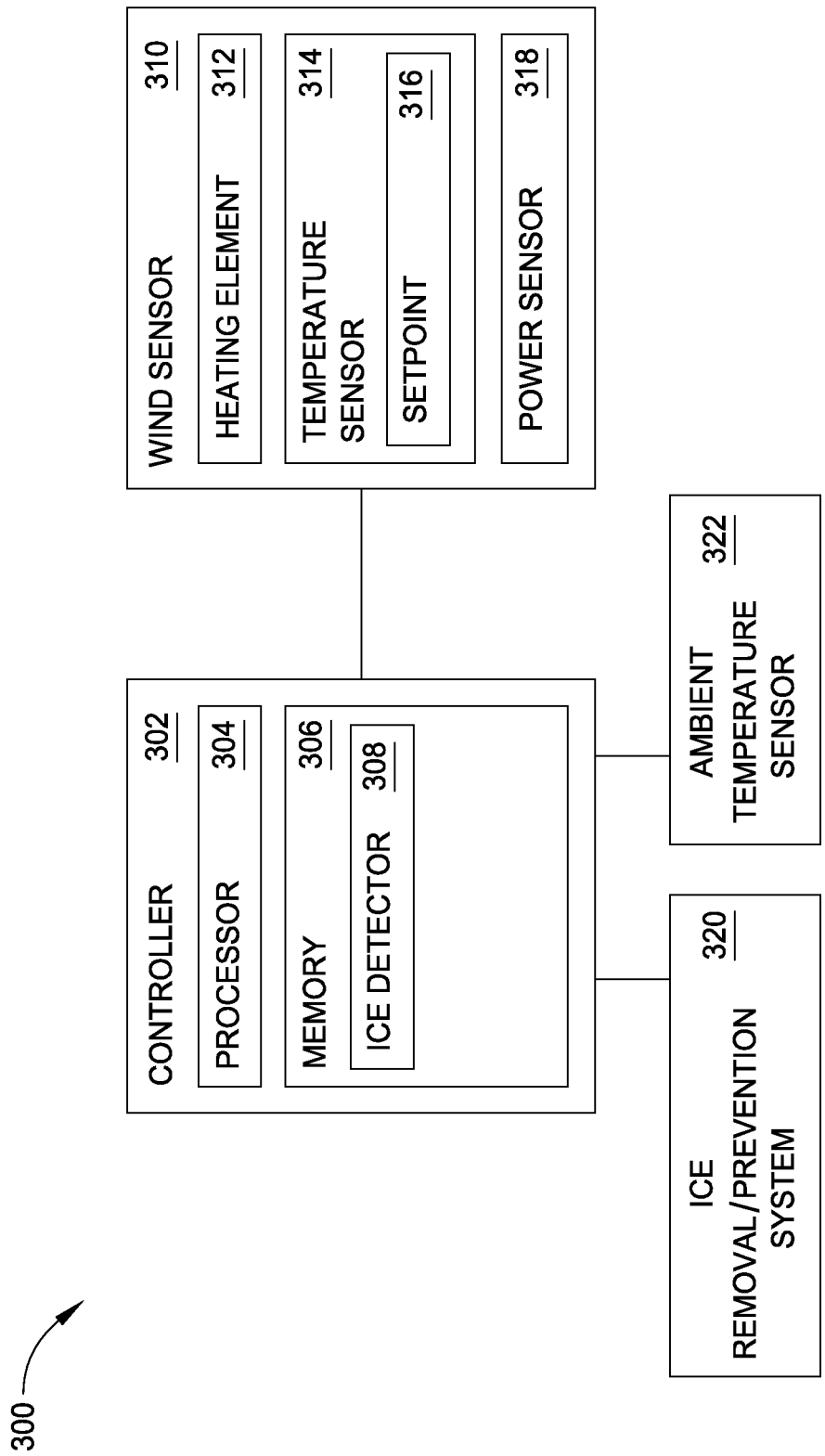
FIG. 3 is a block diagram of a sensor system according to an embodiment described in this present disclosure.

FIG. 3 is a block diagram of a sensor system 300 according to an embodiment described in this present disclosure. The sensor system includes a wind sensor 310 comprising a heating element 312, a temperature sensor 314, and a power sensor 318. In at least one embodiment, the wind sensor 310 is an ultrasonic wind sensor. Although one wind sensor 310 is shown, in other embodiments, two or more sensors are installed for redundancy and continued operation in the event one of the wind sensors is deactivated. A controller 302 monitors and adjusts the heating element 312 such that the temperature of the sensor can achieve the setpoint 316.

In one embodiment, the wind sensor heating element 312 relies on electrical power to control the setpoint temperature 316. The wind sensor 310 has a power sensor 318 embedded therein that measures the power drawn by the heating element 312 (or any parameter indicating the current drawn by the heating element 312). In one embodiment, the power sensor 318 outputs the power consumed by the heating element 312. In at least one embodiment, power drawn by the heating element 312 is calculated by measuring the current flowing to the heating element 312 or voltage across the heating element 312 over time. In one embodiment, the wind sensor 310 outputs to the controller 302 the power consumed by the heating element 312, the temperature of the temperature sensor 314, the specific setpoint 316, and the wind speed. Although shown as being separate from the wind sensor 310, in another embodiment, the wind sensor 310 may include a controller that controls the temperature of the sensor 310 using the reference temperature that comes from the turbine controller 302, or is a fixed default value—e.g., 25 degrees Celsius.

In one embodiment, each wind turbine in a wind park includes at least one sensor system 300. In another embodiment, the sensor system 300 is a centralized control system (e.g., a supervisory control and data acquisition (SCADA) control system) that controls multiple wind turbines.

The processor 304 represents any number of processing elements that each can include any number of processing cores. The memory 306 can include volatile memory elements, non-volatile memory elements, and combinations thereof. Moreover, the memory 306 can be distributed across different mediums (e.g., network storage or external hard drives).

The ice detector 308 can be a software application stored in the memory 306. However, in other embodiments, the ice detector 308 may be implemented using hardware or firmware components. The ice detector 308 monitors an adjustable parameter of the wind sensor 310 to detect the presence of water on the wind turbine. In one embodiment, the adjustable parameter is a power drawn by the heating element 312. However, in other examples, the adjustable parameter may be the temperature of the wind sensor 310, the value of the setpoint 316, measured wind speed, current flowing to the heating element, or voltage across the heating element. Those skilled in the art will appreciate that the adjustable parameter indicating presence of water may be parameters other than those listed above, such as thermal factors.

If ice is detected, the ice detector 308 can activate an ice removal/prevention system 320. In one embodiment, the ice removal/prevention system 320 is a deicing system which removes ice or frost from a surface of the blades. Deicing can be accomplished by electro-thermal means such as through application of heat via a heating element; by the use of chemicals such as alcohols, glycols, or salts; mechanical methods such as vibrations or wind turbine rotor speed changes; or a combination of methods. In another embodiment, the ice removal/prevention system is an anti-icing system which prevents ice from accumulating on wind turbine blades and surfaces. Anti-icing systems may comprise electro-thermal means, maintaining the surface above freezing; fluid based systems, that cover the surface in a protected layer or continuously apply a fluid such as glycol to the susceptible surfaces; application of hydrophobic fluids or materials; or directing hot air or exhaust into the interior of the blades. The appropriate deicing or anti-icing method depends on the environment conditions at a wind turbine and those skilled in the art will recognize that the methods are not limited to the above embodiments.

Figure 4:
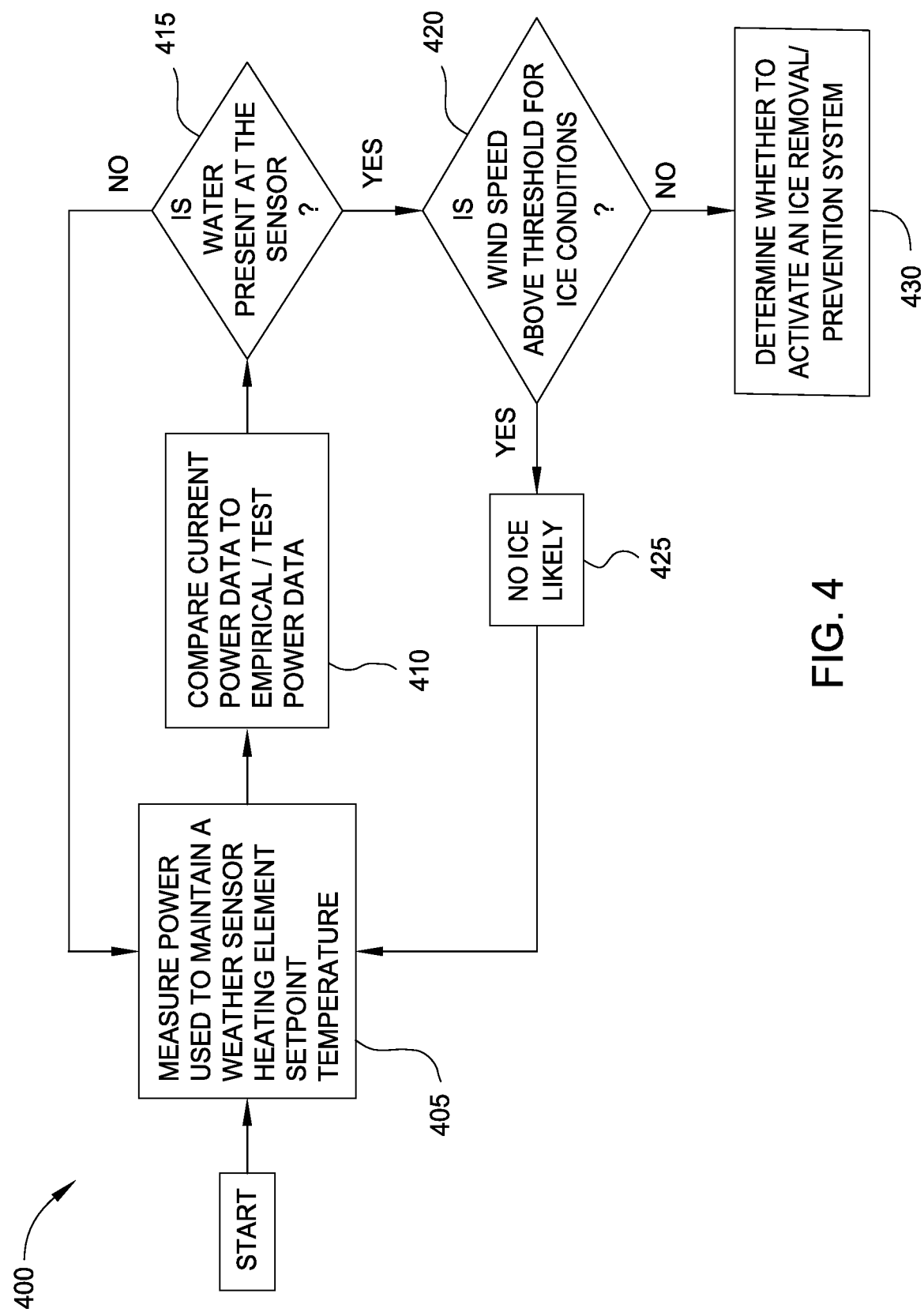
FIG. 4 is a flow chart for detecting water on a sensor according to an embodiment described in this present disclosure.

FIG. 4 is a flow chart of a method 400 for operating a wind turbine sensor system 300 according to an embodiment described in this present disclosure. At block 405, the ice detector measures the power used to maintain the temperature of the wind sensor at a specified setpoint. In this example, the adjustable parameter is the power consumed by the heating element in the wind sensor. As a non-limiting example, if the setpoint was set to a value of 25 degrees Celsius, the power sensor would track the power required to maintain the temperature of the wind sensor at the setpoint value with the current weather conditions. If water (either liquid water or ice) is in contact with the wind sensor, maintaining the temperature of the wind sensor at the setpoint requires more power relative to when there is no water on the sensor (assuming the same ambient temperature, wind speed, and air density). This power increase is due to the latent heat of vaporization of water. The heat emitted by the heating element is absorbed by the water changing phase between a solid to liquid state or from the liquid state to a gaseous state. As such, the power drawn by the heating element increases which is detected by the power sensor and tracked by the ice detector.

Figure 5:
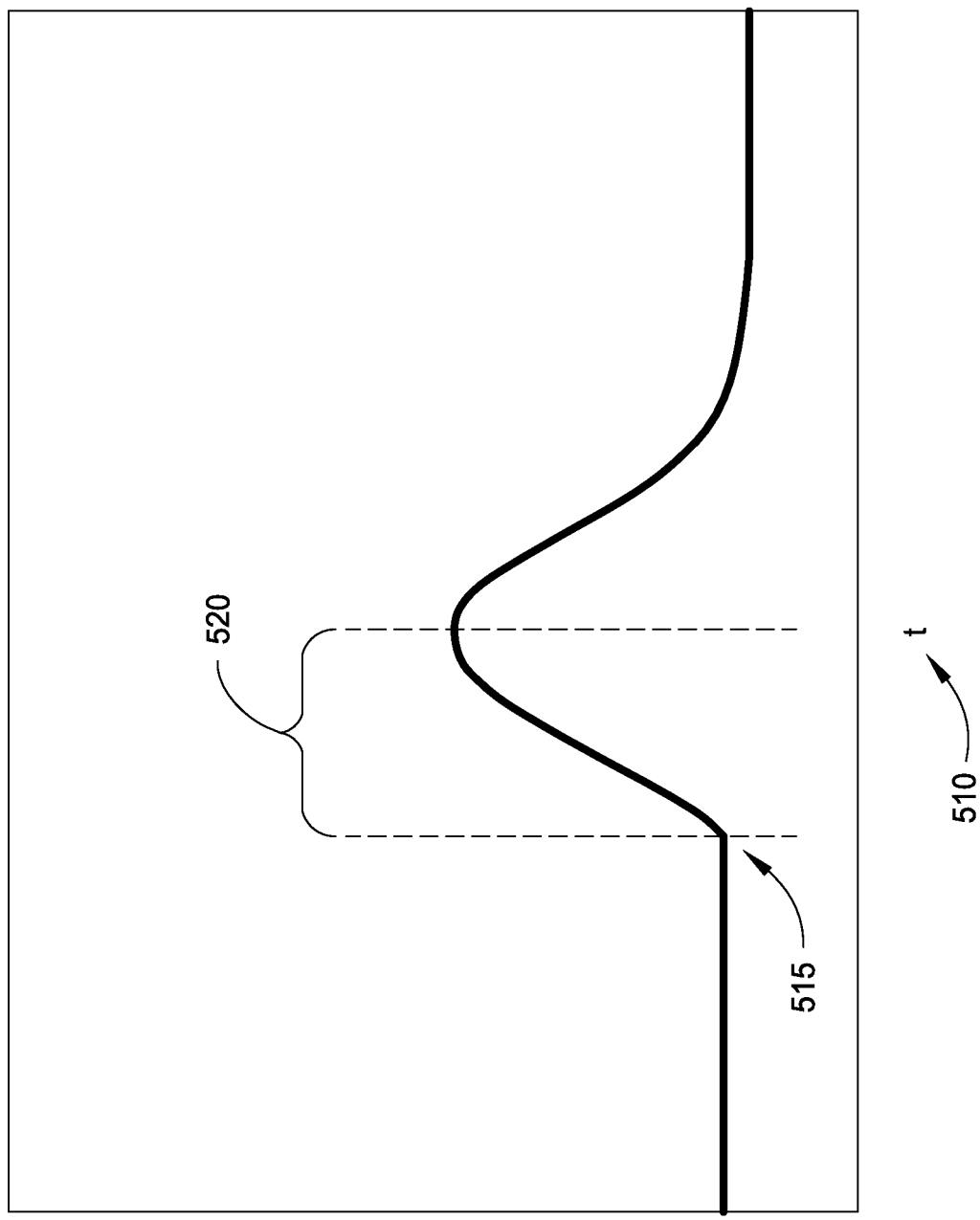
FIG. 5 is a graph illustrating a parameter response to water according to an embodiment described in this present disclosure.

FIG. 5 illustrates a graph 500 where an adjustable parameter changes due to the presence of water on the wind sensor. In graph 500, the adjustable parameter is the power 505 drawn by the heating element in the wind sensor to maintain the wind sensor at the setpoint value as a function of time 510. In graph 500, the ambient temperature and wind speed are assumed to be constant so that the response shown by an inflection at point 515 is attributed only to the presence of water on the wind sensor. Prior to point 515, the power drawn by the heating element is constant. At point 515, water contacts the wind sensor either in the form of liquid water or ice. As discussed above, to maintain the temperature setpoint at a constant value or to restore the temperature to the setpoint temperature, power to the heating element increases to counter the effects caused by the presence of water. In this embodiment, the power increases throughout area 520 due to the latent heat of vaporization of water and once all of the water has evaporated, the power decreases toward a steady state value.

Figure 6:
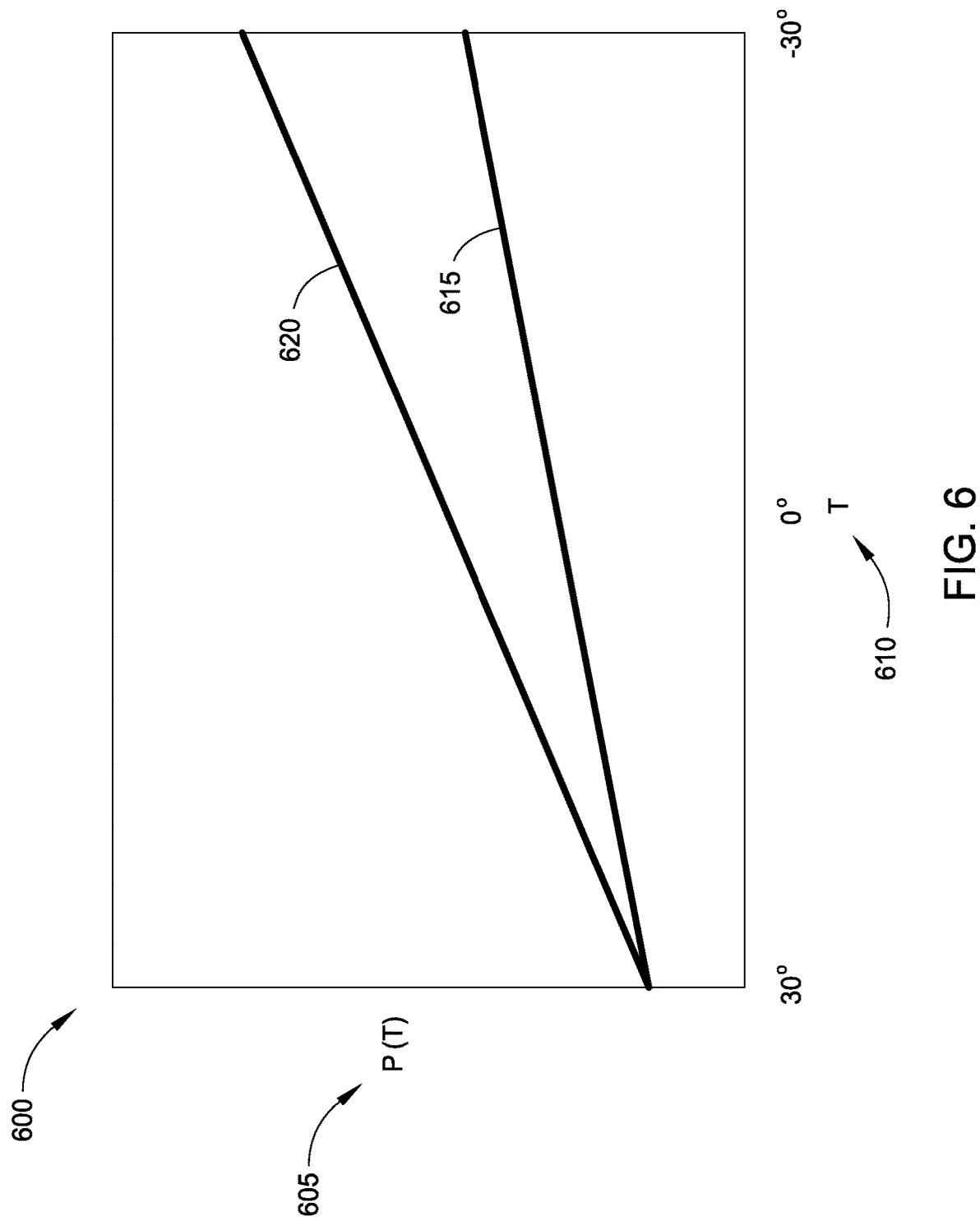
FIG. 6 is a graph illustrating another parameter response to water according to an embodiment described in this present disclosure.

FIG. 6 depicts a graph 600 showing a response of an adjustable parameter controlling a heating element to maintain the temperature of the wind sensor at a desired setpoint according to an embodiment described in this present disclosure. The graph 600 shows the power 605 drawn by the heating element as a function of the ambient temperature 610 at a constant wind speed. A curve 615 shows the power drawn to the heating element as the temperature 610 decreases from 30 degrees Celsius to −30 degrees Celsius under dry conditions, having no liquid is present on the heating element of the sensor. In this embodiment, the power response shown by the curve 615 rises approximately linearly as temperature decreases. A curve 620 shows the power drawn to the heating element as the ambient temperature 610 decreases from 30 degrees Celsius to −30 degrees Celsius under wet conditions, having liquid is present on the heating element of the sensor. The power response shown by the curve 620 rises approximately linearly as temperature decreases. However, the slope of the curve 620 is steeper than the curve 615 because the power required to maintain the sensor temperature at a predetermined setpoint increases correspondingly as the ambient temperature changes due to of the presence of water.

Returning to method 400, at block 410, the ice detector tracks the data from the power sensor and compares it to empirical or laboratory tested power data. The empirical or test power data may be stored locally in the controller or communicated via a network of wind turbine controllers or a combination of stored data and data communicated via the network.

Figure 7:
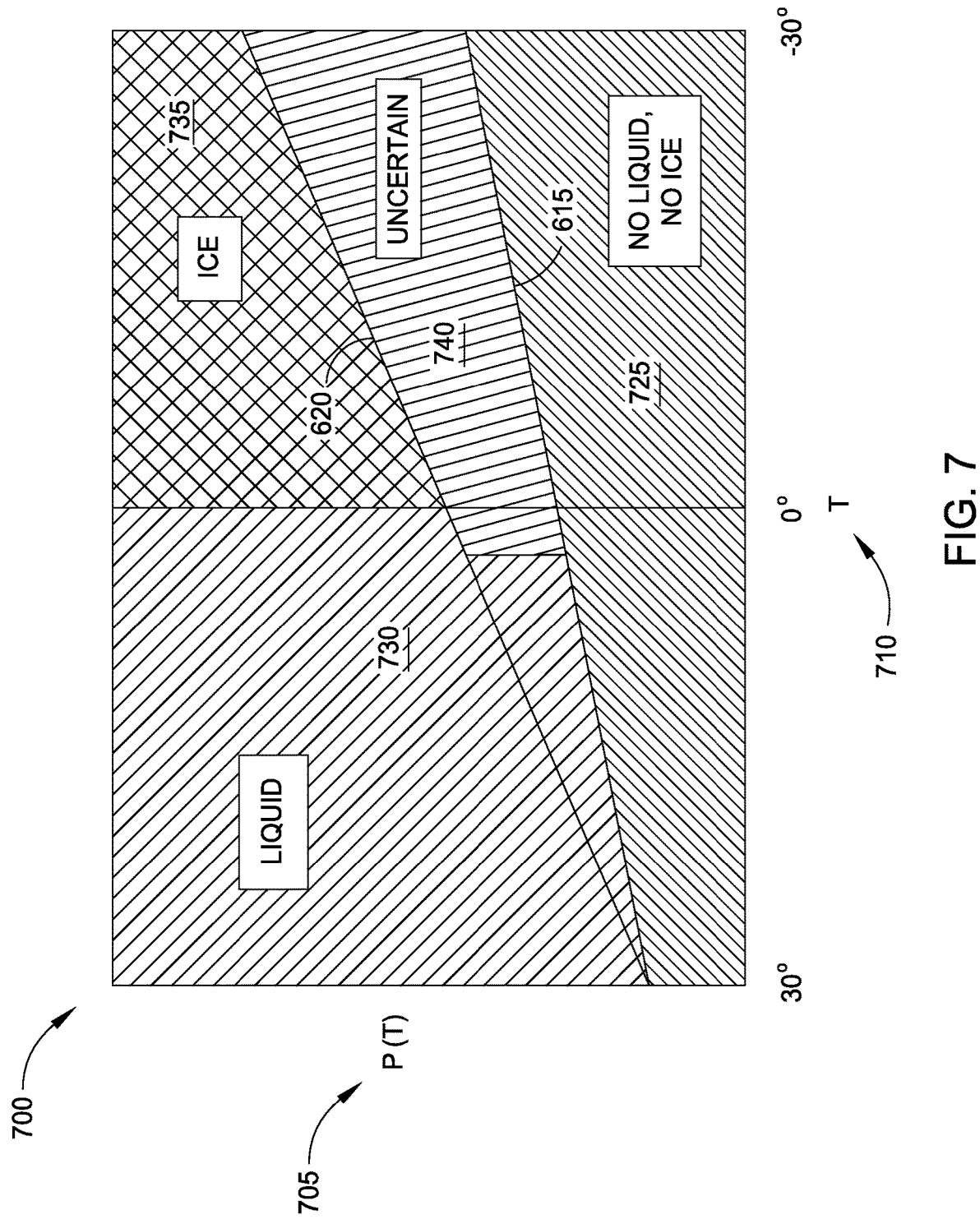
FIG. 7 is an exemplary map of the probability of water on a sensor according to an embodiment described in this present disclosure.

FIG. 7 depicts a map 700 of the likelihood of ice formation or liquid according to the power flowing to a heating element in a wind sensor according to an embodiment described in this present disclosure. In one example, the map 700 is derived from empirical or laboratory tested power data and is used by the ice detector at block 410 of method 400. In one embodiment, the map 700 shows a power 705 drawn to the heating element as a function of the ambient temperature 710 at constant wind speed. The curves 615 and 620 separating the regions are the same shown in FIG. 6 and show the power drawn to the heating element as the temperature 710 decreases from 30 degrees Celsius to −30 degrees Celsius under dry conditions and wet conditions. In at least one embodiment, the power shown by the curves 615 and 620 rises approximately linearly as temperature decreases. Experimental data is used to map regions of where ice formation is likely. In one embodiment, the wind sensor is placed in a controlled environment and subjected to various weather situations to measure the ice formation. For each temperature the power (or other adjustable parameter) is tracked under dry conditions and wet conditions to define the regions of the map 700. Alternatively, sensor data is collected from turbines where a temperature-controlled sensor is exposed to the environment and weather conditions are verified to confirm when water is on the sensor.

Region 725 is defined as a region of low likelihood that water is present on the wind sensor. When the power drawn by the sensor is greater than the curve 620 but the ambient temperature is greater than freezing (0 degrees Celsius in this embodiment) then there is a high likelihood that liquid water is present at the wind sensor. However, in the region 730, since the ambient temperature is above freezing there is a low likelihood that ice is present at the wind sensor. At the region 735, the power drawn by the heating element is greater than the curve 620 and ambient temperature is below freezing, and thus, there is a high likelihood that ice is present at the wind sensor. Region 740 is an area where the likelihood of ice formation on the wind sensor is uncertain. That is, the ice detector cannot accurately determine whether there is water on the sensor. This region shows the power indicating higher than the dry curve 615 but less than the wet curve 620 when the ambient temperature is near or below freezing. To determine the likelihood of ice formation in this region, further verification may be required or the ice detector may initiate an anti-icing or de-icing process as a precaution. Furthermore, the uncertainty of the region 740 would most likely decrease over time as weather conditions are tracked and more empirical data is collected.

As mentioned above, the map 700 can be used by the ice detector of method 400 to track conditions and determine the likelihood of ice formation on the wind sensor. That is, the ice detector uses data in map 700 to compare the current environmental conditions and the value of the adjustable parameter (i.e., the power consumed by the heating element) to determine if liquid is present at the sensor.

If at block 415 the controller determines water (e.g., liquid or ice) is not present at the sensor, the method 400 proceeds to block 405 where the ice detector continues to monitor power consumed by the sensor to maintain the temperature of the sensor at the setpoint. However, when the ice detector determines that liquid or ice is present at the sensor, the method 400 proceeds to block 420 where the ice detector evaluates the wind speed at the wind turbine to determine if the speed is above a threshold for ice conditions. In at least one embodiment, the wind speed acts as a threshold to determine if there is ice forming on the blades, and thus, whether deicing or anti-icing should be performed. As an example, if the wind speed at the turbine is greater than 15 meters per second, ice formation is not likely to occur on the blades and the ice detector continues to monitor power used by the sensor to maintain the temperature at the setpoint as shown by block 405. Put differently, higher wind speeds may prevent the ice for forming. If, however, the wind speed is less than 15 meters per second, the ice detector initiates an anti-icing system or serves as an input to determine whether to activate an ice prevention/removal system or not as indicated by block 430. In one embodiment, the wind speed threshold may change as the ambient temperature changes. For example, ice may not form on the blades if the wind speed is above 15 m/s at 0 degrees Celsius, but at −5 degrees Celsius, the wind speed may need to be at (or greater than) 18 m/s to prevent ice formation on the blades. The method 400 is only one embodiment of an application of system 300. In other embodiments, the system may require less or other setpoints, verification steps, or features.

FIGS. 5-7 are a simplification of environmental conditions that interrelate according to complex situations. For the sake of simplicity, the figures do not show dynamic conditions and responses to conditions that may occur in the heating element from various weather conditions.

Figure 8:
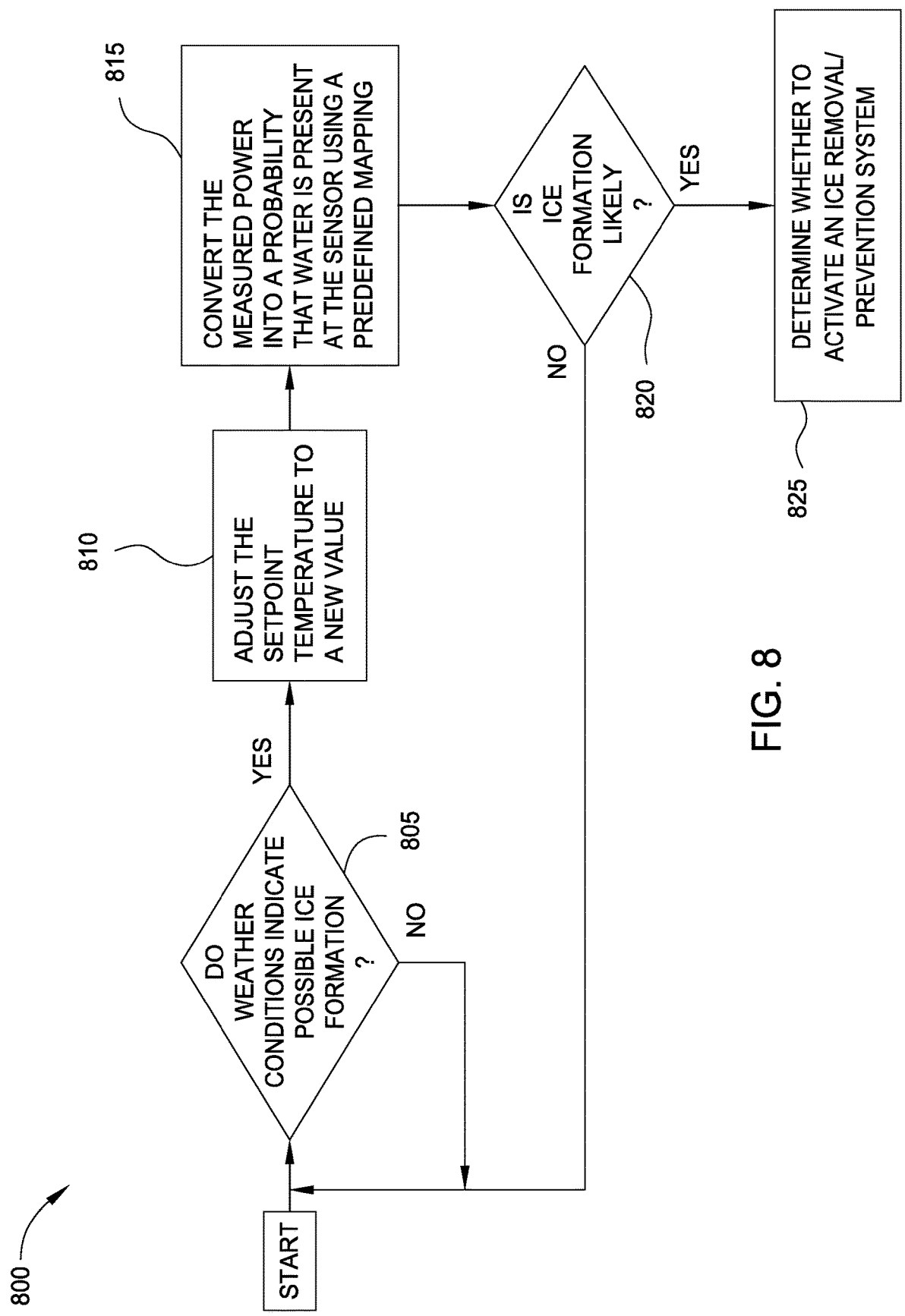
FIG. 8 is a flow chart for detecting water on a sensor according to an embodiment described in this present disclosure.

FIG. 8 is a flow chart of a method 800 for operating the wind turbine sensor system 300 according to an embodiment described in this present disclosure. In one embodiment, as shown by block 805, the ice detector measures and evaluates weather parameters to determine whether ice formation on the blades can occur. In one embodiment, the ice detector uses ambient temperature as a threshold. When temperature is greater than freezing, ice formation on the blades is not possible. In other embodiments, the relationships of weather conditions including, temperature, wind speed, precipitation, and other factors are used in an algorithm to determine if ice is possible. Alternatively, empirical data is mapped to establish regions where ice formation is possible as shown in the map 700. When the ice detector indicates that ice formation is not possible, the method 800 repeats at a predetermined time interval. However, if ice can form on the wind turbine, the method 800 proceeds to block 810 where the ice detector adjusts the setpoint temperature to a new value. Because the measurement of wind speed is affected by adjusting the temperature of the wind sensor, in at least one embodiment, to get an accurate wind speed measurement, the wind speed is measured from a second sensor located on the wind turbine or measured from another wind turbine located in the same array or nearby wherein conditions are substantially similar.

In one example, the ice detector adjusts the setpoint from a value of 15 degrees Celsius to a value of 25 degrees Celsius. The power sensor tracks the power required to increase the sensor to that new value. At block 815, the ice detector converts the measured power into a probability that water is present at the sensor using a predefined mapping as shown in map 700. In one embodiment, the predefined mapping maps the adjustable parameter (e.g., the power drawn by the heating element) to the likelihood of ice formation based on data comprising ambient temperature, wind speed, and the presence of water on the sensor.

In one embodiment, the predefined mapping is determined through empirical data. To generate the predefined mapping, conditions are held constant while one factor is adjusted to measure a response of the adjustable parameter. For example, the adjustable parameter is power drawn by the heating element while the wind speed is held constant with liquid water present on the sensor. In this example, wind speed is increased while power drawn to the sensor is tracked. After the power is recorded for all temperatures in the appropriate range, the experiment can be repeated without liquid water on the sensor. Data can then be compiled and used by the ice detector to determine ice formation based on a reading of the power drawn to the heating element, current ambient temperature, and the wind speed and comparing the measured readings to previously recorded empirical data. When the setpoint is set to a new, higher temperature value at block 810 and water is in contact with the sensor heating element, achieving the new setpoint requires an increase in power as compared to the power drawn without the presence of water. If at block 820 the ice detector determines ice formation is likely, the method 800 proceeds to block 825 and the ice detector determines whether to activate an ice prevention/removal system. For example, the ice detector may initiate an anti-icing procedure or use the indication of ice formation as an input to determine whether to activate a de-icing system or not. When ice formation is not likely, the method 800 repeats at a predetermined time interval.

Figure 9:
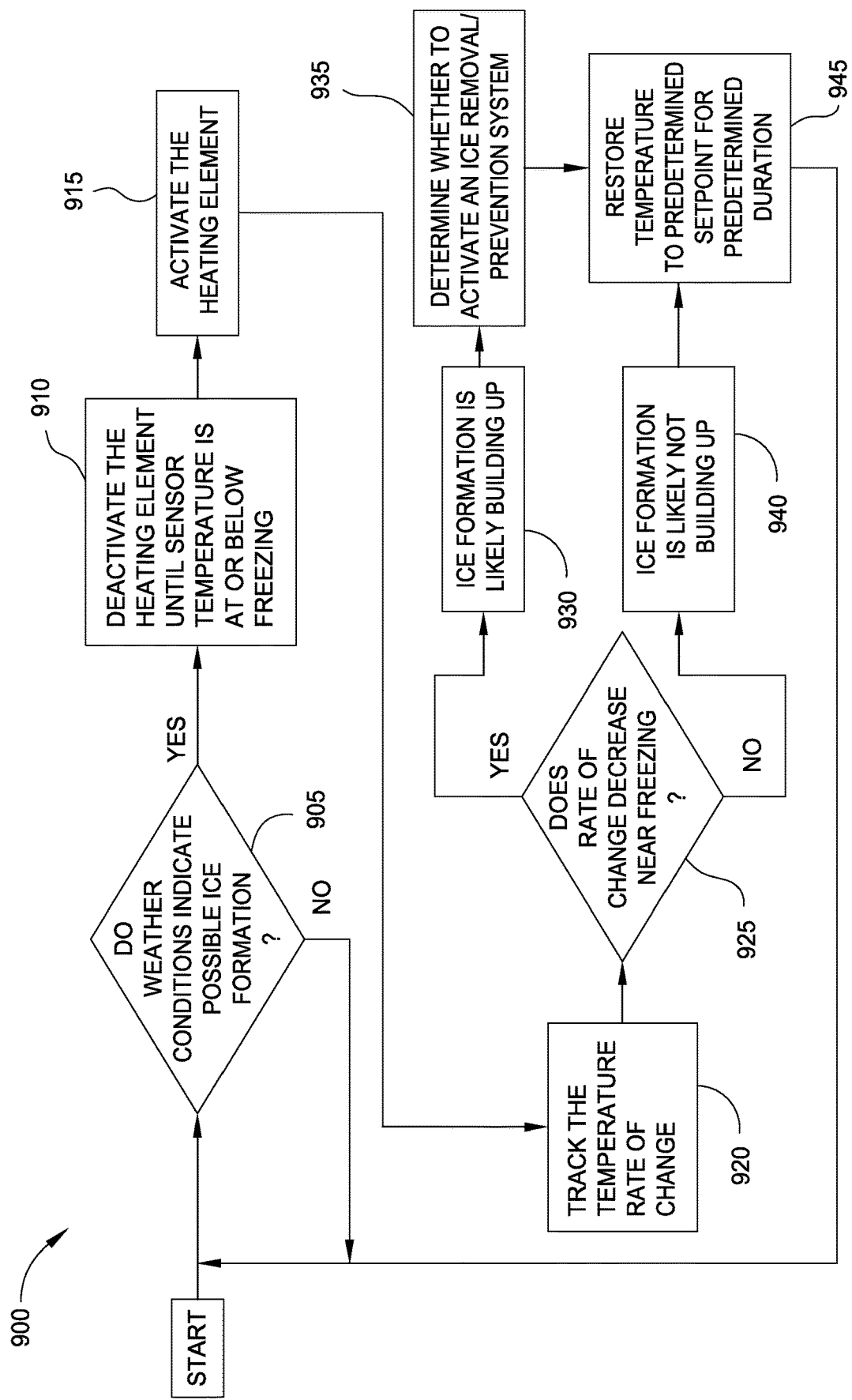
FIG. 9 is a flow chart for detecting water on a sensor according to an embodiment described in this present disclosure.

FIG. 9 is a flow chart of a method 900 for operating a wind turbine sensor system 300 according to an embodiment described in this present disclosure. At block 905, the ice detector measures and evaluates weather parameters to determine whether ice formation on the wind turbine blades is possible. In one embodiment, the ice detector may perform any of the techniques described at block 805 of method 800 to determine if icing is possible. When ice formation is not possible, the method 900 repeats at a predetermined time interval. However, if ice formation is possible, the method 900 proceeds to block 910 where the ice detector deactivates the heating element until the temperature of the wind sensor is at or below freezing. Because the measurement of wind speed is affected by adjusting the temperature of the sensor, in at least one embodiment, wind speed is measured from a second sensor located on the wind turbine or measured from another wind turbine located in the same array or nearby wherein conditions are substantially similar.

In one example, if the setpoint was initially set to a value of 25 degrees Celsius, the ice detector deactivates the wind sensor heating element until the temperature sensor in the wind sensor has a value of −2 degrees Celsius. At block 915, the ice detector reactivates the heating element. In one embodiment, the ice detector reactivates the heating element once the temperature sensor reaches the ambient temperature. However, in another embodiment, the ice detector keeps the heating element in a deactivate state for a predetermined period of time to allow ice to build up on the wind sensor. Upon activation, the heating element restores the temperature of the wind sensor to the temperature setpoint (e.g., 25 degrees Celsius). The ice detector tracks the rate of change of the temperature sensor as the heating element restores the temperature of the wind sensor to the setpoint value as shown by block 920. Due to the heat absorbed when water changes from a solid (ice) to a liquid, the rate of temperature can include "dead-zone" or a substantially reduced rate of temperature increase. When undergoing a phase changes, the water absorbs energy from the heating element such that the temperature does not change as rapidly as if there were no water present. The rate of change decrease occurs when the temperature of the wind sensor is at or near freezing at 0 degrees Celsius (e.g., +/−5 degrees Celsius). When there is no significant decrease in the rate of change of temperature near freezing, ice formation has likely not occurred and in at least one embodiment, the heating element continues to heat up until the temperature sensor returns to its initial value.

After the wind sensor has returned to its initial temperature or measurably above freezing without the occurrence of a dead zone, the ice detector determines at block 940 that ice is likely not building up on the wind sensor (or the blades) and at block 945 restores the temperature to its predetermined setpoint. The method 900 may repeat at a predetermined time interval. However, if the rate of temperature change does decrease near freezing, ice formation is likely building up as shown by block 930, and thus, the ice detector can determine there is likely ice present on the blades. In response, at block 935, the ice detector determines whether to activate an ice prevention/removal system. The ice detector may continue to allow the heating element to continue to heat up until the temperature sensor returns to its initial value and then the method 900 may repeat at a predetermined time period.

Figure 10:
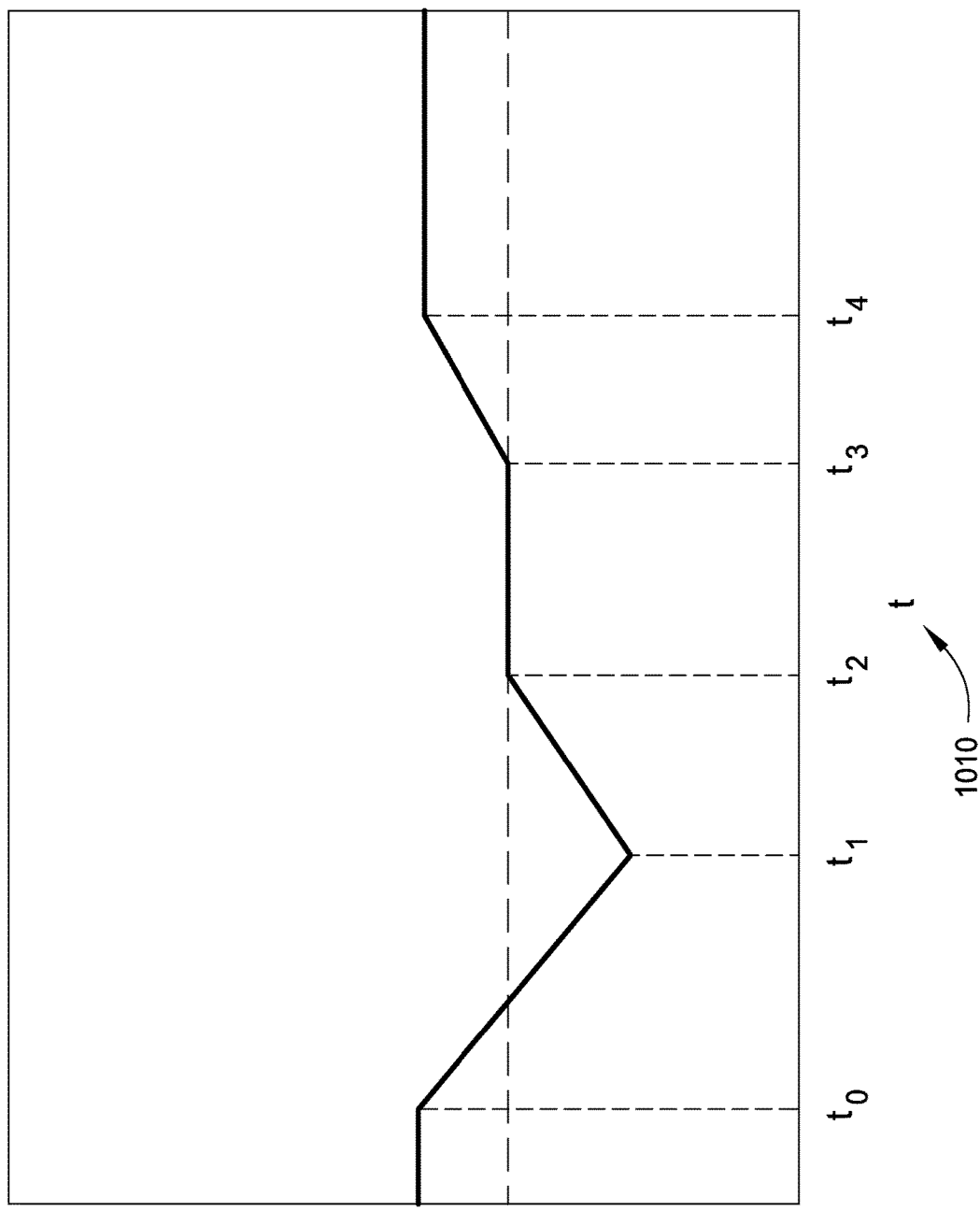
FIG. 10 is a graph illustrating another parameter response to water according to an embodiment described in this present disclosure.

FIG. 10 is a graph 1000 illustrating a temperature 1005 changing with time 1010 according to the method 900. In the graph 1000, a heating element maintains the sensor temperature at a given setpoint. Prior to point to, temperature is constant. At point to, however, a weather event triggers the sensor to deactivate the heating element (e.g., block 910 of method 900). In a non-limiting example embodiment, the ambient temperature falling below 2 degrees Celsius may trigger the deactivation of the sensor.

After deactivating the heating element, the temperature of the wind sensor decreases at a rate dependent on ambient conditions. When the temperature decreases to a value measurably below 0 degrees Celsius (e.g., the ambient temperature), at point $t_1$, the ice detector reactivates the sensor heating element which corresponds to the block 915 of method 900. In one embodiment, the controller permits the temperature to stay at the ambient temperature, which is below 0 degrees Celsius, for a predefined time period to allow potential ice buildup. In one embodiment, the heating element is deactivated until the temperature of the sensor is approximately equal to the ambient temperature. In other embodiments, the heating element is deactivated for a predetermined time period, e.g., for 10 minutes or 30 minutes, to provide sufficient time for ice to form on the sensor. Upon reactivation, the temperature of the sensor begins to increase. If there is no presence of liquid water or ice on the sensor, the rate of increase may be relatively constant and have no appreciable changes to the rate of increase. However, with ice present on the sensor, the temperature increases to approximately freezing and then the rate of temperature change decreases due to the ice melting which absorbs the energy from the heating element. The lower rate of temperature change at approximately the freezing point (i.e., the dead zone) is indicated at point $t_2$ on the graph 1000. As the heating element continues to output heat, the dead zone terminates at point $t_3$ after the ice melts. Up until point $t_4$, the temperature of the sensor continues to increase and return to the setpoint value. As mentioned above, the dead zone indicates the presence of ice on the wind sensor which means there is a high likelihood that ice has also formed on the blades. In response, the ice detector may activate the ice prevention/removal system.

Figure 11:
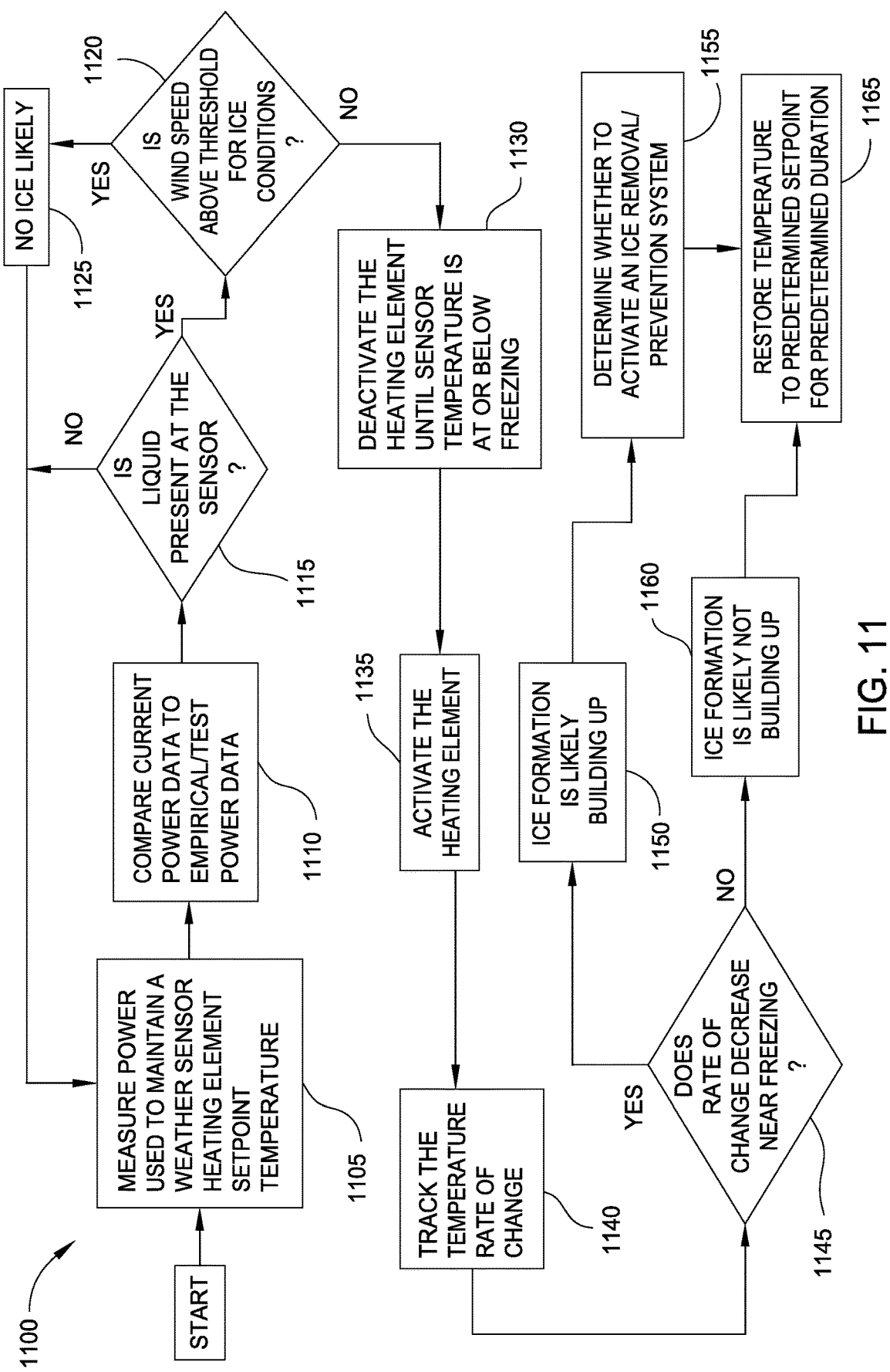
FIG. 11 is a flow chart for detecting water on a sensor according to an embodiment described in this present disclosure.

FIG. 11 is a flow chart of a method 1100 for operating a wind turbine sensor system 300 according to an embodiment described in this present disclosure. The method 1100 is a combination of method 400 and method 900. The combination depicted as method 1100 provides reassurance that ice is present at the sensor before initiating a potentially expensive de-icing or anti-icing procedure. At block 1105, an ice detector instructs a power sensor to measure the power used to maintain a wind sensor heating element setpoint at a predetermined value (e.g., 25 degrees Celsius). At block 1110, the ice detector tracks and compares the power drawn by the heating element to empirical or test power data. The analysis performed at block 1110 of the method 1100 may be the same analysis performed at block 410. Based off the analysis of block 1110, the ice detector indicates when water is disposed on the sensor as indicated by block 1115. When water is not present at the sensor as shown by block 1125, the method 1100 proceeds to block 1105 where the ice detector continues to monitor the power consumed by the sensor to maintain the sensor temperature at the setpoint. However, if liquid water is present at the wind sensor, the method proceeds to block 1120 where the ice detector determines whether the current (or an average) wind speed satisfies a threshold where ice can form on the blades. For example, when wind speed is greater than 15 meters per second, ice formation may not likely to occur on the wind turbine blades and the ice detector continues to monitor the power consumed to maintain the temperature at the setpoint as shown by block 1105.

However, when ice formation is possible (e.g., based on the empirical or test power data and wind speed as shown by map 700), the method 1100 proceeds to block 1130 where the ice detector deactivates the heating element until the temperature sensor is at or below freezing. In one example, if the setpoint was initially set to a value of 25 degrees Celsius, the ice detector deactivates until the temperature sensor indicates a value of below freezing, and performs the same actions shown in block 910. In one embodiment, the controller permits the temperature to stay at the ambient temperature, which is below 0 degrees Celsius, for a predefined time period to allow potential ice buildup. At block 1135 the ice detector reactivates the heating element. Upon activation, the heating element restores the temperature of the wind sensor to the temperature setpoint. The ice detector tracks the rate of change of the temperature sensor as the heating element restores the setpoint to its initial value as shown by block 1140. Due to the heat absorbed when water changes from ice to a liquid, the rate of temperature can include "dead-zone" or a substantially reduced rate of temperature increase. When there is no significant decrease in the rate of temperature change, ice formation has likely not occurred.

After the setpoint has returned to its initial value or measurably above freezing without the occurrence of a dead zone, the ice detector determines at block 1160 that ice is likely not building up on the wind sensor (or the blades) and at block 1165 restores the temperature to its predetermined setpoint. The method 1100 may repeat at a predetermined time interval. However, if the rate of temperature change does decrease near freezing, ice formation is likely building up on the wind sensor as shown by block 1150 and thus, the ice detector can determine ice is forming on the blades. In response, at block 1155, the ice detector determines whether to activate an ice prevention/removal system. The ice detector may continue to allow the heating element to continue to heat up until the temperature sensor returns to its initial value and then the method 1100 may repeat at a predetermined time period.

In the preceding, reference is made to embodiments presented in this disclosure. However, the scope of the present disclosure is not limited to specific described embodiments. Instead, any combination of the features and elements provided above, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

The present invention may be a system, a method, and/or a computer program product. The computer program product may include a computer-readable storage medium (or media) (e.g., a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing) having computer readable program instructions thereon for causing a processor to carry out aspects of the present invention.

Aspects of the present disclosure are described with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

The invention claimed is:

1. A controller for a wind turbine, comprising:
a processor;
a memory comprising an application that, when executed by the processor, performs an operation, the operation comprising:
activating a heating element disposed in a wind sensor of the wind turbine, the wind sensor configured to detect a wind speed;
monitoring a power consumed by the heating element to maintain a temperature of the wind sensor at a setpoint;
determining a likelihood that water is disposed on the wind sensor based on the power consumed over a period of time;
deactivating the heating element to reduce a temperature of the wind sensor to below freezing or to an ambient temperature;
after deactivating the heating element and after the temperature of the wind sensor is reduced below freezing or to the ambient temperature, activating the heating element;
after activating the heating element, tracking a rate of change of the temperature of the wind sensor;
verifying that water is disposed on the wind sensor based on the rate of change; and
activating at least one of an anti-icing system and a de-icing system based on at least one of the likelihood or the rate of change.

2. The controller of claim 1, wherein determining the likelihood comprises converting the power consumed to the likelihood that water is disposed on the wind sensor using a predefined mapping that maps the power consumed to a likelihood of ice formation based on data comprising ambient temperature, wind speed, and a presence of water.

3. The controller of claim 1, wherein the operation further comprises upon determining the likelihood that water is on the wind sensor and that a wind speed satisfies a threshold, determining that ice is on a blade of the wind turbine.

4. The controller of claim 1, the operation further comprising determining that ice is disposed on the wind sensor using a predefined mapping.

5. A method comprising:
adjusting a temperature setpoint of a wind sensor to a new value, the wind sensor comprising a heating element disposed within the wind sensor and configured to heat the wind sensor, the wind sensor configured to detect a wind speed;
measuring a response of the wind sensor when adjusting the temperature setpoint of the wind sensor to the new value;
converting the response to a likelihood that water is disposed on the wind sensor using a predefined mapping;
deactivating the heating element to reduce a temperature of the wind sensor to below freezing or to an ambient temperature;
after deactivating the heating element and after the temperature of the wind sensor is reduced below freezing or to the ambient temperature, activating the heating element;
after activating the heating element, tracking a rate of change of the temperature of the wind sensor;
verifying that water is disposed on the wind sensor based on the rate of change; and
activating at least one of an anti-icing system and a deicing system based on at least one of the likelihood or the rate of change.

6. The method of claim 5, wherein the predefined mapping maps the response to a likelihood of ice formation based on data comprising ambient temperature, wind speed, and a presence of water.

7. The method of claim 5, further comprising upon determining the likelihood that water is disposed on the wind sensor and wind speed satisfies a threshold, determining that ice is on a blade of a wind turbine.

8. An ice detecting system for a wind turbine, the system comprising:
a wind sensor comprising a heating element disposed within the wind sensor and configured to set a temperature of the wind sensor; and
a controller configured to:
activate the heating element;
monitor a power consumed by the heating element to maintain a temperature of the wind sensor at a setpoint;
determine a likelihood that water is disposed on the wind sensor based on the power consumed over a period of time;
deactivate the heating element to reduce a temperature of the wind sensor to below freezing or to an ambient temperature;
after deactivating the heating element and after the temperature of the wind sensor is reduced below freezing or to the ambient temperature, activate the heating element;
after activating the heating element, track a rate of change of the temperature of the wind sensor;
verify that water is disposed on the wind sensor based on the rate of change; and
activate at least one of an anti-icing system and a deicing system based on at least one of the likelihood or the rate of change.

* * * * *